United States Patent
Hughes

(10) Patent No.: US 9,596,956 B2
(45) Date of Patent: Mar. 21, 2017

(54) APPARATUS FOR AND METHOD OF MAKING COFFEE

(71) Applicant: Cameron T. Hughes, Garden City, NY (US)

(72) Inventor: Cameron T. Hughes, Garden City, NY (US)

(73) Assignee: Invergo, Inc., Garden City, NY (US)

( * ) Notice: Subject to any disclaimer, the term of this patent is extended or adjusted under 35 U.S.C. 154(b) by 7 days.

(21) Appl. No.: 14/569,842

(22) Filed: Dec. 15, 2014

(65) Prior Publication Data

US 2015/0164267 A1 Jun. 18, 2015

Related U.S. Application Data

(60) Provisional application No. 61/917,378, filed on Dec. 18, 2013.

(51) Int. Cl.
*A47J 31/46* (2006.01)
*A23F 5/36* (2006.01)

(52) U.S. Cl.
CPC .................................. *A47J 31/465* (2013.01)

(58) Field of Classification Search
CPC ........ A47J 31/465; A47J 31/46; A47J 31/408; A47J 31/02; A47J 31/4403; A47J 31/057; A47J 31/005; A47J 31/061; A47J 31/60; A47J 31/4485; A47J 31/4482; A23F 5/36
USPC ..... 99/287, 284, 302 R, 315, 280, 282, 283, 99/286, 289 R, 290, 295, 299, 305–309; 426/433–435
See application file for complete search history.

(56) References Cited

U.S. PATENT DOCUMENTS

| | | | | |
|---|---|---|---|---|
| 2,206,424 A | * | 7/1940 | Oyen | A47J 31/007 99/282 |
| 3,229,612 A | * | 1/1966 | Brown | A47J 31/408 126/362.1 |
| 3,327,613 A | * | 6/1967 | Davis | A47J 31/408 222/335 |
| 7,225,728 B2 | | 6/2007 | Lyall, III | |

(Continued)

FOREIGN PATENT DOCUMENTS

| | | | | |
|---|---|---|---|---|
| JP | WO 0057761 A1 | * | 10/2000 | ......... A47J 31/0631 |
| KR | 20090075650 A | * | 7/2009 | |

OTHER PUBLICATIONS

"Ice & Hot Microcomputer Type Coffee Maker (IC-3900)", Sep. 29, 2009, Rakuten, 5 pages, http://global.rakuten.com/en/store/wich/item/ic3900/.

(Continued)

*Primary Examiner* — David Angwin
*Assistant Examiner* — Biniam Asmelash
(74) *Attorney, Agent, or Firm* — Kirschstein, Israel, Schiffmiller & Pieroni, P.C.

(57) ABSTRACT

An apparatus for making coffee, in accordance with an automated pour-over method, includes a housing having a movable water spout, a basket for holding a bed of coffee grounds below the spout, a pump for moving water through the spout for delivery and distribution onto the bed, and a drive for moving the spout along a hypotrochoidal path during distribution of the water to saturate the bed with substantially uniform water coverage and to extract the coffee with substantial consistency as the water permeates and passes by gravity through the bed.

11 Claims, 6 Drawing Sheets

(56) References Cited

U.S. PATENT DOCUMENTS 8,333,144 B2 * 12/2012 Boussemart .......... A47J 31/061
99/280
2015/0075387 A1 * 3/2015 Lee ........................ A47J 31/46
99/289 R

OTHER PUBLICATIONS

"Robotic Coffee Pour-Overs Coming to World Maker Faire", Aug. 21, 2013, Make: Magazine, 2 pages, http://makezine.com/2013/08/21/robotic-coffee-pour-overs-coming-to-world-maker-faire/.

* cited by examiner

APPARATUS FOR AND METHOD OF MAKING COFFEE

CROSS-REFERENCE TO RELATED APPLICATION

This application claims the priority of U.S. provisional patent application Ser. No. 61/917,378, filed Dec. 18, 2013, the entire contents of which are hereby incorporated herein by reference thereto.

FIELD OF THE DISCLOSURE

The present disclosure relates generally to an apparatus for, and a method of, making coffee and, more particularly, to brewing coffee utilizing an automated pour-over technique, in which water is poured and distributed onto a bed of coffee grounds with substantially uniform water coverage to extract the coffee with substantial consistency as the water permeates and passes through the bed.

BACKGROUND

Many different types of coffee makers using different brewing principles are well known. In a conventional pour-over brewing technique, a paper or metal filter is initially placed inside a conical basket or funnel, and coffee grounds are placed in the filter to form a coffee bed. The basket is set over a cup, carafe, or like lower container, and heated water is then manually poured over the coffee bed, preferably in a circular motion. As the water permeates the coffee bed and passes by gravity through the basket, the coffee is extracted and collected in the lower container for subsequent consumption. Although generally satisfactory for its intended purpose, this pour-over technique is not only physically laborious to many users, but also produces inconsistent results. The quantity and pour rate of the water is not readily controllable. The circular motion is often not repeatable. The coffee bed is often not uniformly saturated and, as a result, the taste and flavor of the coffee are not optimal and typically vary from cup to cup.

In an effort to automate the pour-over technique, it is known, in a non-commercial use, such as a kitchen appliance, to automatically move an overhead water spout above the coffee bed in a repetitive circular motion. However, this results in an uneven water coverage and distribution since those areas directly above the water spout tend to be over-saturated, while those areas not directly above the water spout tend to under-saturated. This uneven water distribution causes the water to unevenly burrow through paths of least resistance through the coffee bed. As a consequence, the coffee extraction is not uniform, and the coffee taste and flavor are not optimal and variable. It is also known, in a commercial use, such as a coffee shop, to use an industrial robot to automatically move an overhead water spout above a coffee bed in a spiral motion using two motors, one to rotate a respective spout, and the other to tilt the respective spout, and thereupon to sequentially move the spout to successive coffee beds arranged along a row. However, such an industrial robot is not suitable for a non-commercial use, is cost-prohibitive, and, in any event, the coffee extraction is again not entirely uniform, and the coffee taste and flavor could be enhanced and improved.

Accordingly, there is a need to saturate a coffee bed with a more uniform water coverage, and to extract coffee with more consistency to thereby obtain coffee with an enhanced taste and flavor that does not appreciably vary from one cup to the next, in a cost-effective manner.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
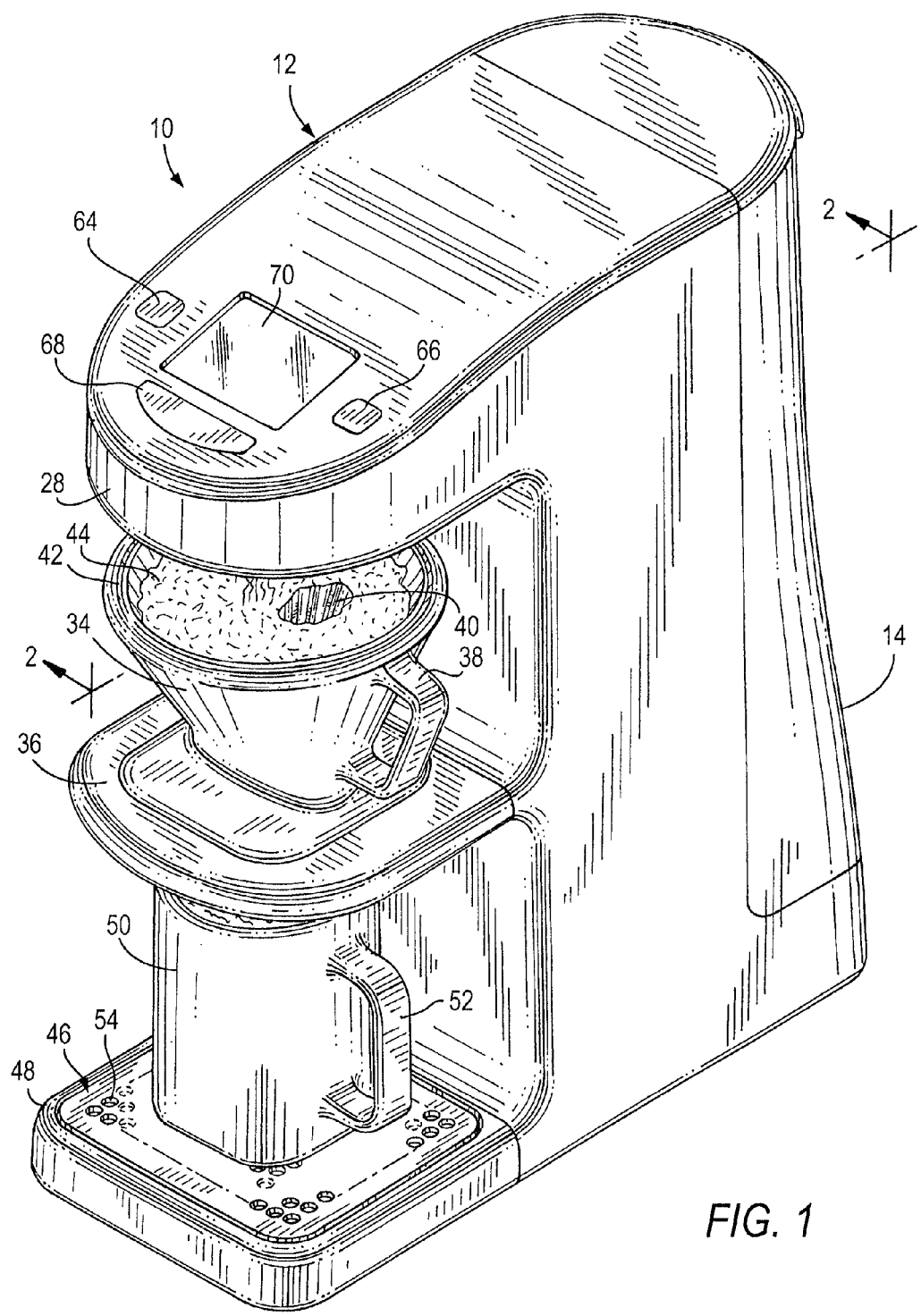
FIG. 1 is a front, upper, and right side, perspective view of an apparatus for making coffee in accordance with this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates, briefly stated, in an apparatus for making coffee, that includes a housing having a movable water spout, a basket for holding a bed of coffee grounds below the spout, a pump for moving water through the spout for delivery and distribution onto the bed, and a drive for moving the spout, preferably repetitively, along a hypotrochoidal path during distribution of the water to saturate the bed with substantially uniform water coverage and to extract the coffee with substantial consistency as the water permeates and passes through the bed. The hypotrochoidal path ensures that the coffee bed will be saturated with a more uniform water coverage than heretofore, and also ensures that the coffee will be extracted with more consistency than heretofore to thereby obtain coffee with an enhanced taste and flavor that does not appreciably vary from one cup to the next.

In a preferred embodiment, a reservoir is supported by the housing, for supplying the water to the pump, and an energizable heater is also supported by the housing, for heating the water prior to reaching the spout. A controller, e.g., a programmed microprocessor, is operative either for energizing the heater in a hot brewing mode of operation, or for deenergizing the heater in a cold brewing mode of operation. The pump delivers heated water onto the bed during the hot brewing mode, and delivers non-heated water onto the bed during the cold brewing mode. The controller controls the drive to either continuously or intermittently move the spout along the hypotrochoidal path, and also controls the pump to either continuously or intermittently move the water through the spout as the latter continuously or intermittently moves along the hypotrochoidal path. Advantageously, the drive includes a single motor and a gear transmission operatively connected between the single motor and the spout. The transmission includes a first outer ring gear symmetrical about a first axis and rotatable by the single motor about the first axis, a second inner ring gear symmetrical about a second axis, and a third stationary gear. The second inner ring gear is movable by the first outer ring gear about the first axis and engages the third stationary gear to also rotate about the second axis.

In accordance with another feature of this invention, a method of making coffee is performed by holding a bed of coffee grounds below a movable water spout, moving water through the spout for delivery and distribution onto the bed, and moving the spout, preferably repetitively, along a hypotrochoidal path during distribution of the water to saturate the bed with substantially uniform water coverage and to extract the coffee with substantial consistency as the water permeates and passes through the bed.

Figure 2:
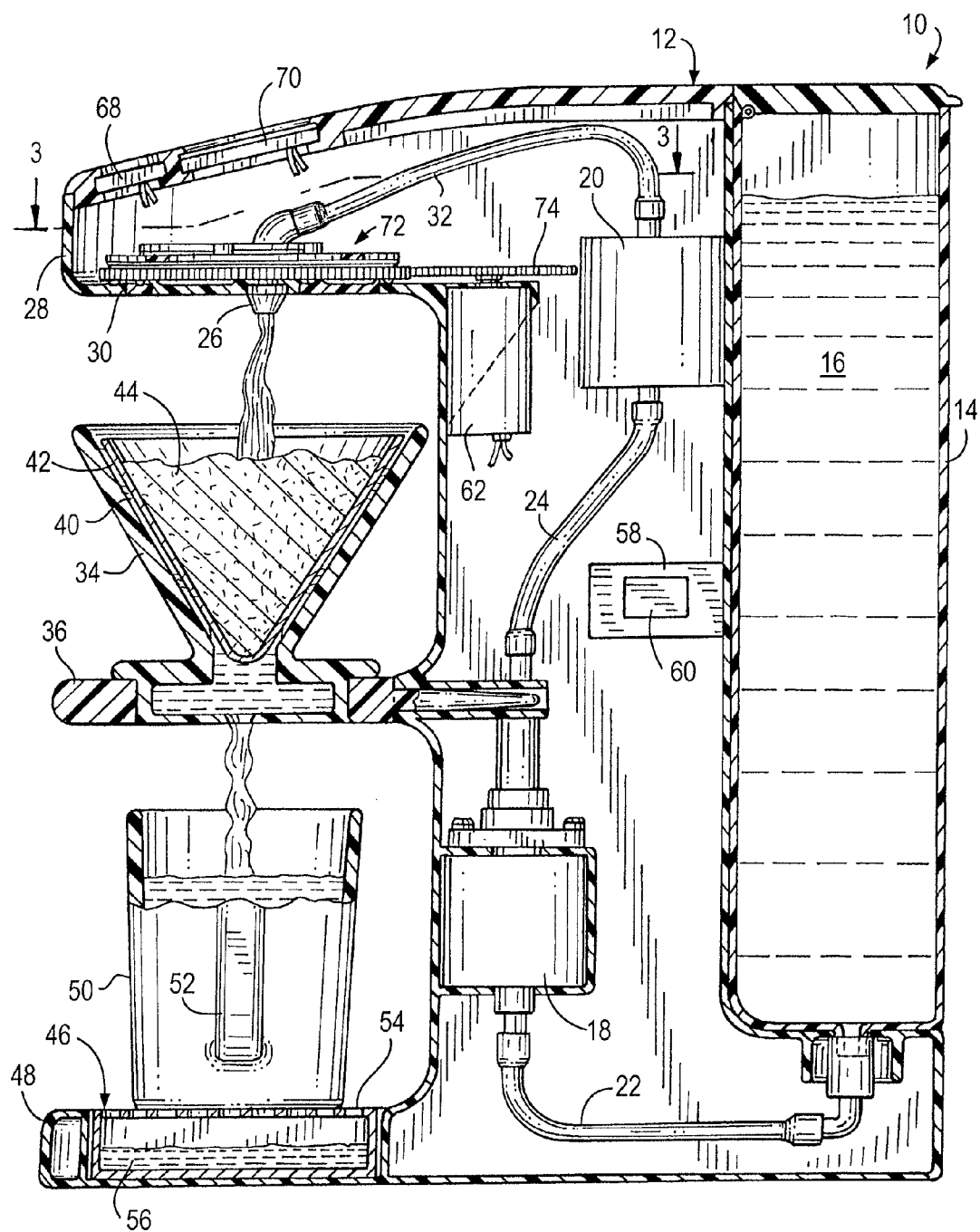
FIG. 2 is a sectional view of the apparatus taken along line 2-2 of FIG. 1.

Turning now to the drawings, reference numeral 10 in FIGS. 1-2 generally identifies an apparatus, preferably a kitchen electrical appliance, for making coffee. The apparatus 10 includes a housing 12 having a refillable water tank or reservoir 14 mounted at a rear of the housing 12, for holding a supply of water 16. The housing 12 and the reservoir 14 are advantageously constituted and molded of synthetic plastic materials. As best shown in FIG. 2, the housing 12 is hollow, and an electrically-operated water pump 18 and an electrically-operated water heater 20 are both mounted in an interior of the housing 12. A fluid inlet of the pump 18 is connected to the reservoir 14 by a hose or hollow tube 22, and a fluid outlet of the pump 18 is connected to a fluid inlet of the heater 20 by a hose or hollow tube 24.

Figure 6:
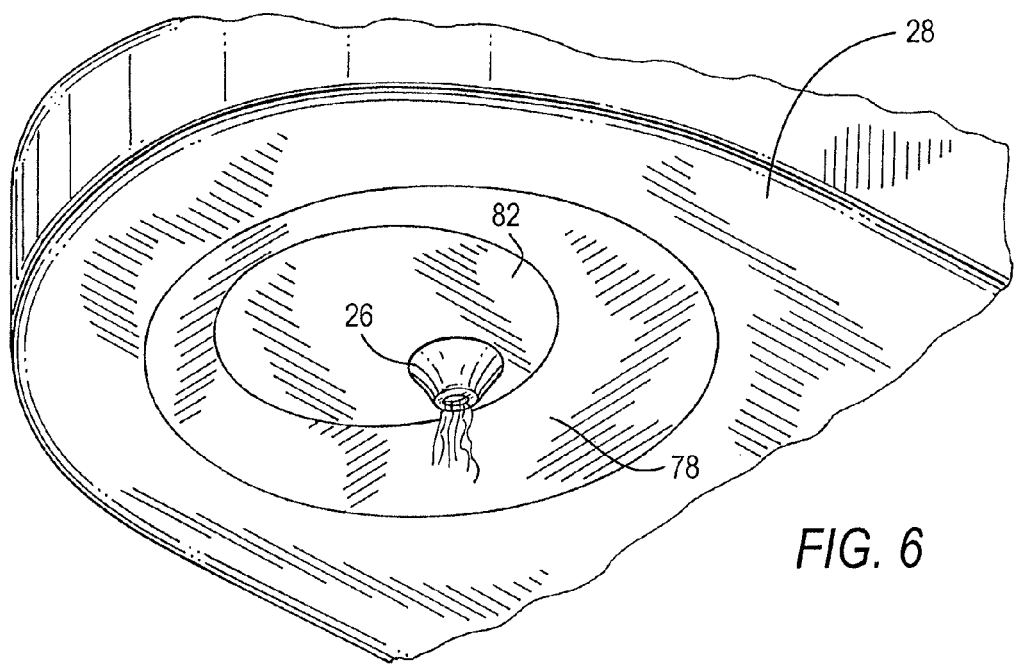
FIG. 6 is an enlarged, perspective view of a movable water spout as seen from below the upper housing portion of the apparatus of FIG. 1.

A water spigot or spout 26 (see also FIG. 6) is supported by an upper cantilevered portion 28 of the housing 12. The spout 26 is upright and extends along a vertical axis that is generally perpendicular to a generally planar, horizontal support surface 30 of the upper cantilevered portion 28. As described below, the spout 26 is preferably repetitively movable in a horizontal plane defined by the support surface 30 during operation of the apparatus 10. A fluid outlet of the heater 20 is connected to the spout 26 by a hose or hollow tube 32 that is flexible, sufficiently long, and movable inside the upper cantilevered portion 28 to accommodate the movement of the spout 26.

A generally conical funnel or basket 34 is mounted directly below the spout 26 on a platform 36 that is removably mounted on a front of the housing 12 below the upper cantilevered portion 28. The basket 34 may have a handle 38 and an array of interior, tapered ribs 40 (see FIG. 1) on its inner conical surface. A generally conical coffee filter 42, typically made of fluid-permeable paper or a metal mesh, is placed inside the basket 34 to rest against the ribs 40. Coffee grounds are placed inside the filter 42 to form a coffee bed 44 of coffee grounds.

A drip tray 46 is mounted directly below the basket 34 at a front lower portion 48 of the housing 12. A cup, mug, or like container 50, preferably having a handle 52, is mounted on a generally planar, apertured surface 54 of the drip tray 46. The drip tray 46 has a hollow interior to collect fluid spillage 56, as described below.

A controller 60, e.g., a programmed microprocessor, is mounted on a printed circuit board 58 in the interior of the housing 12. As described below, the controller 60 controls the pump 18, the heater 20, and an electrical drive motor 62 that is also mounted within the housing 12. An on/off power button 64, an override button 66, and a brew button 68, all of which are mounted on the upper cantilevered portion 28 for ease of access, are electrically connected as inputs to the controller 60. A display screen 70 is also mounted on the upper cantilevered portion 28 for ease of visibility and is also electrically connected to the controller 60. The electrical connections between the controller 60, the pump 18, the heater 20, the motor 62, the control buttons 64, 66, 68, and the display screen 70, as well as a main power cable that supplies electrical power to the apparatus 10, have been omitted from the drawings so as not to unduly encumber them.

Figure 3:
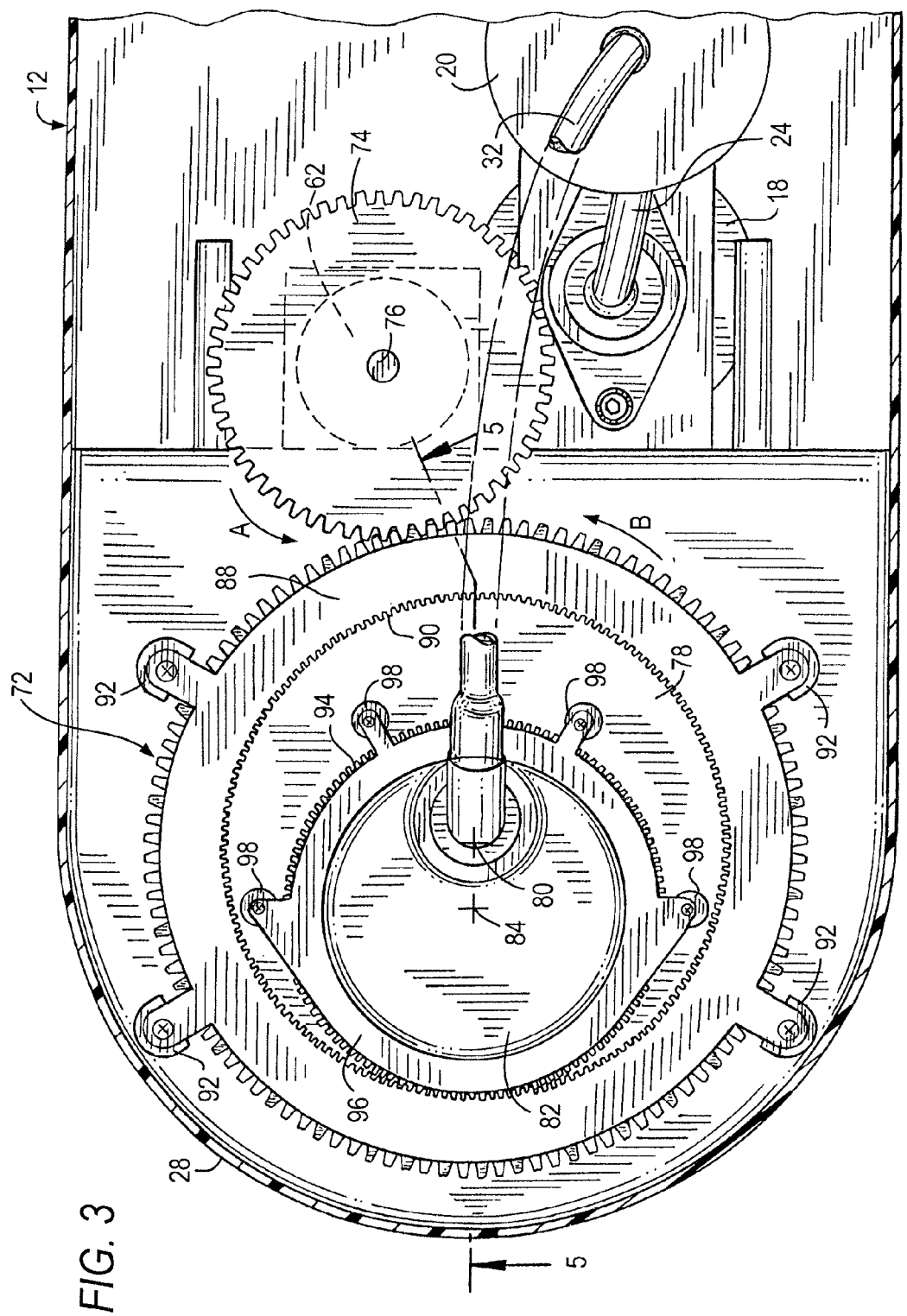
FIG. 3 is an enlarged, broken-away, top plan view taken along line 3-3 of FIG. 2.
Figure 4:
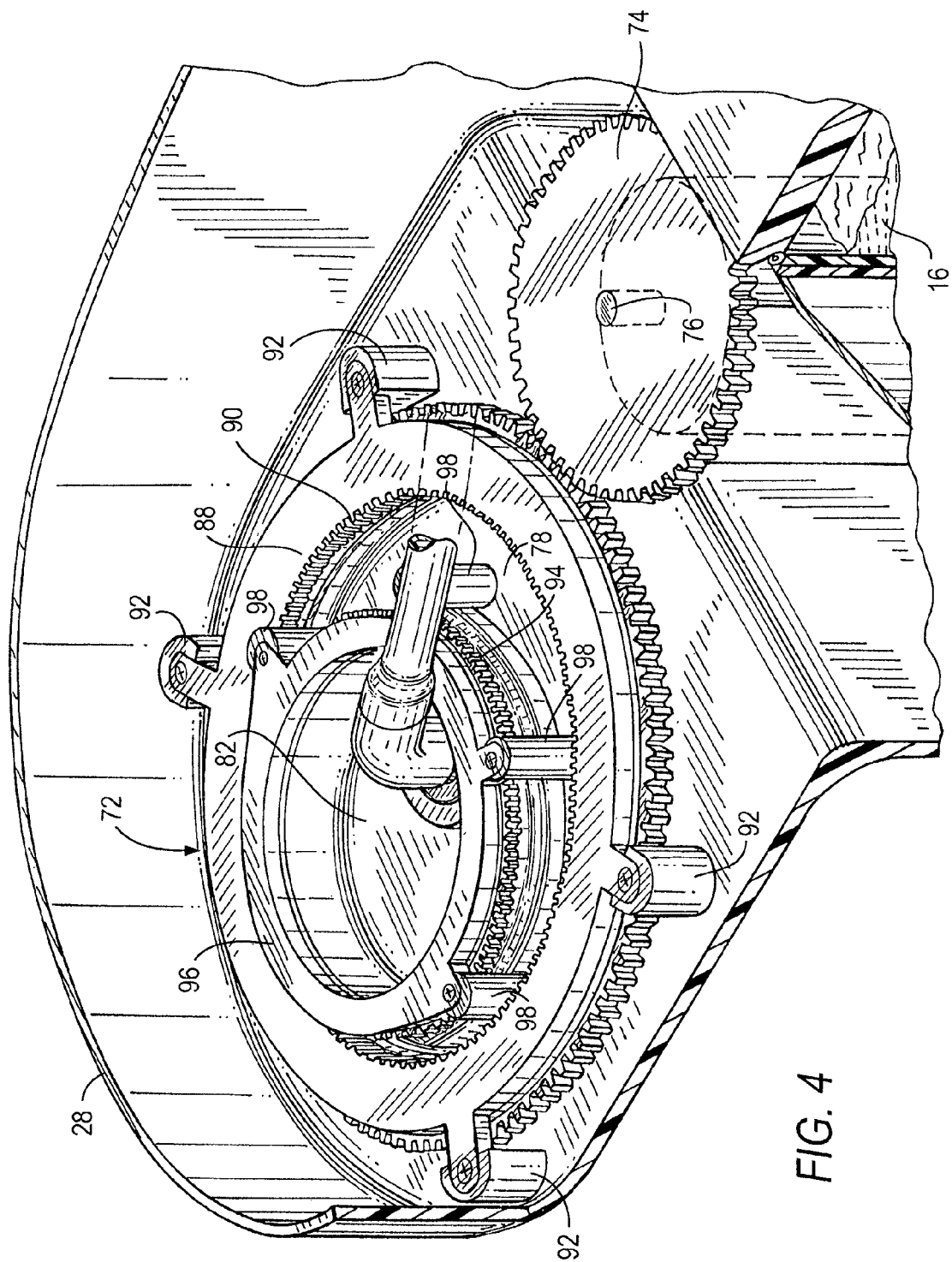
FIG. 4 is an enlarged, broken-away, perspective view of a gear transmission inside an upper housing portion of the apparatus of FIG. 1.
Figure 5:
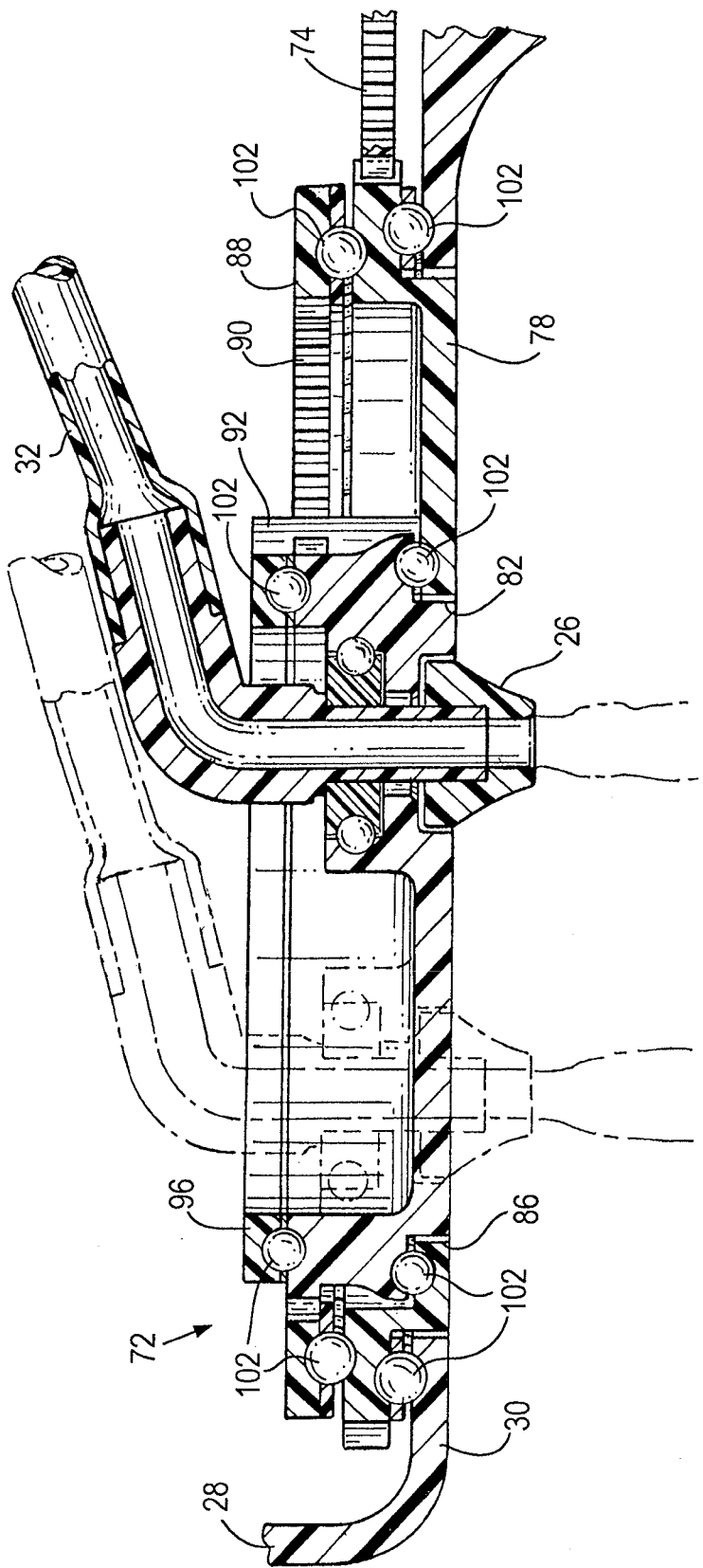
FIG. 5 is broken-away, enlarged, sectional view taken on line 5-5 of FIG. 3.

The aforementioned drive motor 62 is a single unidirectional motor that, together with a gear transmission 72, as best shown in FIGS. 3-5, is operative for repetitively moving the spout 26 along a hypotrochoidal path 100 (see FIG. 7) during operation of the apparatus 10. The motor 62 has a drive gear 74 mounted for rotation in the direction of arrow A (FIG. 3) on a drive shaft 76 of the motor 62. External teeth on the drive gear 74 mesh with external teeth of a first outer circular ring gear 78. The first outer ring gear 78 is symmetrical about a first vertical axis that passes through its center 80 (FIG. 3) and is rotatable by the drive gear 74 about the first axis in the direction of arrow B (FIG. 3).

A second inner circular ring gear 82 of smaller diameter than the first outer ring gear 78 is symmetrical about a vertical second axis that passes through its center 84 (FIG. 3). The second inner ring gear 82 is mounted in a well 86 of the first outer ring gear 78 and jointly rotates with the latter about the first axis in the direction of arrow B (FIG. 3).

A third stationary circular ring gear 88 having the same diameter as the first outer ring gear 78 has internal teeth 90. The stationary gear 88 is held fixed by a plurality of outer fasteners 92 arranged circumferentially about the stationary gear 88, and axially holds the first outer ring gear 78 down. The internal teeth 90 mesh with external teeth 94 of the second inner ring gear 82. As the second inner ring gear 82 jointly rotates with the first outer ring gear 78 about the first axis, the engagement between the moving external teeth 94 and the internal teeth 90 cause the second inner ring gear 82 to also rotate about the second axis. A fourth stationary circular ring gear 96 having the same diameter as the second inner ring gear 82 is held fixed by a plurality of outer fasteners 98 arranged circumferentially about the second inner ring gear 82, and axially holds the second inner ring gear 82 down. Thrust or ball bearings 102, as illustrated in FIG. 5, reduce sliding friction between opposing surfaces of the rotating gears. Instead of bearings, the opposing surfaces of the rotating gears, which slidingly engage each other, can be constituted of an anti-friction material, such as Teflon (trademark).

The spout 26 is mounted on the second inner ring gear 82 at a radial distance from the center 84 and participates with its motion along the hypotrochoidal path 100, in which the spout 26 not only rotates about the second axis, but also orbits about the first axis.

Figure 7:
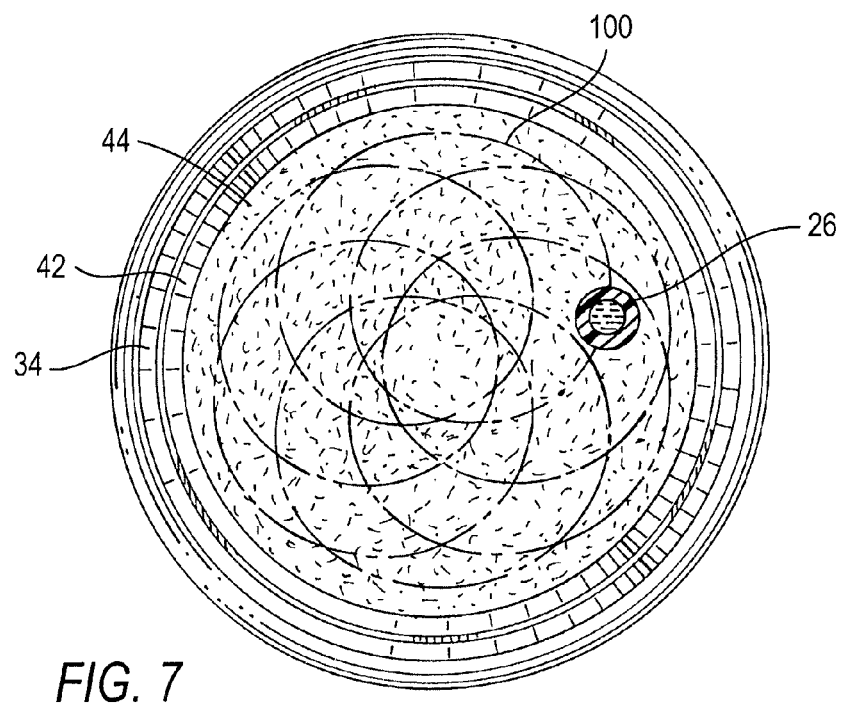
FIG. 7 is an enlarged, top plan view of a basket containing a filter filled with a bed of coffee grounds in the apparatus of FIG. 1, and depicting a hypotrochoidal path along which the spout is moved.

In a hot brewing mode of operation, after the power button 64 is actuated, the controller 60 energizes the pump 18 to pump a quantity of the water 16 out of the reservoir 14, and also energizes the heater 20 to heat the pumped water prior to delivery of the heated water to the spout 26. At the same time, the controller 60 energizes the motor 62 to drive the gear transmission 72 and move the spout 26 along the hypotrochoidal path 100. The heated water issuing from the moving spout 26 is delivered and distributed onto the coffee bed 44, whereupon the water permeates and passes by gravity through the coffee bed 44 and the basket 34, and is then collected in the cup 50 for subsequent consumption. Any liquid spillage 56 not collected in the cup 50 is caught by the drip tray 46. As shown in FIG. 7, the distribution of the heated water saturates the coffee bed 44 with a substantially uniform water coverage and enables the coffee to be extracted with a substantial consistency.

During the hot brewing mode, the spout 26 may be moved either continuously or intermittently, and the pump 18 may be controlled to deliver either continuous or intermittent bursts of heated water. Programming of the timing and duration of the continuous or intermittent bursts is performed at the brewing button 68 in response to prompts displayed on the display screen 70. In a cold brewing mode of operation, the operation is as described above for the hot mode, except that the heater is not energized.

The aforementioned override button 66 overrides any programming performed by the brewing button 68 in association with the controller 60 and the display screen 70. Depressing the override button 66 enables the drive motor 62, and allows the water 16 to be discharged while moving the spout 26. This is useful when a user wishes to wet the coffee filter 42 prior to placing the coffee grounds therein, thereby avoiding a "paper" taste sometimes present when the filter is not wetted in advance. The aforementioned removable platform 36 is removed when it is desired to use a single brewing container that combines the function of the basket 34 and the lower container 50. This brewing container, one type of which is known commercially as a Chemex (trademark) container, is typically taller than the container 50 and, hence, the platform 36 is removed to provide room for the taller brewing container.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, or contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An apparatus for making coffee, comprising:
   a housing having a movable water spout;
   a basket for holding a bed of coffee grounds below the spout;
   a pump for moving water through the spout for delivery and distribution onto the bed; and
   a drive configured for moving the spout to orbit about a first axis, and to simultaneously rotate about a second axis that is parallel to the first axis, along a hypotrochoidal path during distribution of the water to saturate the bed with substantially uniform water coverage and to extract the coffee with substantial consistency as the water permeates and passes through the bed.

2. The apparatus of claim 1, and a reservoir supported by the housing, for supplying the water to the pump; an energizable heater supported by the housing, for heating the water prior to reaching the spout; and a controller for energizing the heater in a hot brewing mode of operation, and wherein the pump delivers heated water onto the bed during the hot brewing mode of operation.

3. The apparatus of claim 1, and a reservoir supported by the housing, for supplying the water to the pump; an energizable heater supported by the housing, for heating the water prior to reaching the spout; and a controller for deenergizing the heater in a cold brewing mode of operation, and wherein the pump delivers non-heated water onto the bed during the cold brewing mode of operation.

4. The apparatus of claim 1, wherein the basket allows the extracted coffee to pass therethrough; and a platform supported by the housing, for supporting the basket above a container for collecting the extracted coffee that passed through the basket.

5. The apparatus of claim 4, wherein the platform is removable from the housing.

6. The apparatus of claim 1, wherein the drive includes a single motor and a gear transmission operatively connected between the single motor and the spout, and wherein the transmission includes a first outer ring gear symmetrical about the first axis and rotatable by the single motor about the first axis, a second inner ring gear symmetrical about the second axis, and a third stationary gear; and wherein the second inner ring gear is movable by the first outer ring gear about the first axis and engages the third stationary gear to also rotate about the second axis.

7. The apparatus of claim 1, and a controller for controlling the drive to continuously move the spout along the hypotrochoidal path, and for controlling the pump to continuously move the water through the spout as the latter continuously moves along the hypotrochoidal path.

8. The apparatus of claim 1, and a controller for controlling the drive to intermittently move the spout along the hypotrochoidal path, and for controlling the pump to intermittently move the water through the spout as the latter intermittently moves along the hypotrochoidal path.

9. The apparatus of claim 1, wherein the drive is operative for repetitively moving the spout in a generally horizontal plane above the basket.

10. The apparatus of claim 1, and a coffee filter mounted in the basket; and a controller for controlling the pump to wet the filter prior to holding the coffee grounds in the basket.

11. An apparatus for making coffee, comprising:
a housing having a movable water spout;
a basket for holding a bed of coffee grounds below the spout;
a pump for moving water through the spout for delivery and distribution onto the bed; and
a drive configured for moving the spout along a hypotrochoidal path during distribution of the water to saturate the bed with substantially uniform water coverage and to extract the coffee with substantial consistency as the water permeates and passes through the bed, the drive including a gear transmission having a first outer ring gear rotatable about a first axis, a second inner ring gear symmetrical about a second axis and rotatable by the first outer ring gear about the first axis, and a third stationary gear engaging the second inner ring gear and causing the second inner ring gear to also rotate about the second axis, the spout being mounted on the second inner ring gear to rotate about the second axis and to simultaneously orbit about the first axis along the hypotrochoidal path.

* * * * *